United States Patent
Watford

(10) Patent No.: US 10,847,333 B2
(45) Date of Patent: Nov. 24, 2020

(54) CIRCUIT BREAKERS INCLUDING DUAL TRIGGERING DEVICES AND METHODS OF OPERATING SAME

(71) Applicant: Siemens Industry, Inc., Alpharetta, GA (US)

(72) Inventor: Russell Thomas Watford, Lawrenceville, GA (US)

(73) Assignee: Siemends Industry, Inc., Alpharetta, GA (US)

( * ) Notice: Subject to any disclaimer, the term of this patent is extended or adjusted under 35 U.S.C. 154(b) by 162 days.

(21) Appl. No.: 16/133,034

(22) Filed: Sep. 17, 2018

(65) Prior Publication Data
US 2020/0090891 A1    Mar. 19, 2020

(51) Int. Cl.
*H01H 50/54* (2006.01)
*H01H 71/24* (2006.01)
*H02H 3/02* (2006.01)
*H01H 71/02* (2006.01)
*H01H 71/32* (2006.01)
*H02H 3/08* (2006.01)

(52) U.S. Cl.
CPC .... *H01H 71/2463* (2013.01); *H01H 71/0271* (2013.01); *H01H 71/325* (2013.01); *H02H 3/02* (2013.01); *H02H 3/08* (2013.01)

(58) Field of Classification Search
CPC ........ H01H 71/02; H01H 71/24; H01H 71/32; H01H 73/02; H02H 3/02; H02H 3/08
USPC ............................................................. 335/2
See application file for complete search history.

(56) References Cited

U.S. PATENT DOCUMENTS

| | | | | |
|---|---|---|---|---|
| 2,620,417 A | * | 12/1952 | Lewis | H01H 73/04 200/244 |
| 2,634,347 A | * | 4/1953 | Lewis | H01H 71/40 335/35 |
| 3,106,627 A | * | 10/1963 | Lisnay | H01H 71/2472 218/149 |
| 3,990,103 A | * | 11/1976 | Stalley | H04N 9/896 348/498 |
| 3,999,103 A | * | 12/1976 | Misencik | H01H 83/226 361/45 |
| 4,001,743 A | * | 1/1977 | Arnhold | H01H 71/526 335/201 |
| 4,093,838 A | * | 6/1978 | Nicol | H01H 71/00 200/303 |

(Continued)

*Primary Examiner* — Shawki S Ismail
*Assistant Examiner* — Lisa N Homza

(57) ABSTRACT

A circuit breaker includes a first electrical contact and a second electrical contact moveable between an open state and a closed state; an armature, wherein movement of the armature from a first position to a second position initiates the first electrical contact and the second electrical contact to move from the closed state to the open state; a first electromagnetic device configured to move the armature from the first position to the second position in response to being energized by a first signal; and a second electromagnetic device configured to move the armature from the first position to the second position in response to being energized by a second signal and in response to generation of the first signal and the first electrical contact and the second electrical contact still being in the closed state. Other circuit breakers and methods of operating circuit breakers are disclosed.

12 Claims, 6 Drawing Sheets

(56) References Cited

U.S. PATENT DOCUMENTS

| | | | | |
|---|---|---|---|---|
| 4,222,019 A * | 9/1980 | Rusch | H01H 71/528 | 335/202 |
| 4,291,291 A * | 9/1981 | Merchant | H01H 71/528 | 335/167 |
| 4,292,611 A * | 9/1981 | Bresson | H01H 3/222 | 335/147 |
| 4,323,868 A * | 4/1982 | Harper | H01H 71/58 | 335/174 |
| 4,417,222 A * | 11/1983 | Schmitt | H01H 71/1081 | 335/6 |
| 4,559,510 A * | 12/1985 | Franz | H01H 71/02 | 335/13 |
| 4,616,200 A * | 10/1986 | Fixemer | H01H 71/524 | 335/35 |
| 4,636,760 A * | 1/1987 | Lee | H01H 89/08 | 335/14 |
| 4,700,161 A * | 10/1987 | Todaro | H01H 83/20 | 335/172 |
| 4,725,799 A * | 2/1988 | Bratkowski | H01H 89/08 | 335/14 |
| 4,754,162 A * | 6/1988 | Kondou | H01H 89/08 | 307/112 |
| 4,879,535 A * | 11/1989 | Mori | H01H 89/08 | 335/14 |
| 4,897,625 A * | 1/1990 | Yokoyama | H01H 51/2209 | 335/14 |
| 4,947,145 A * | 8/1990 | Ohishi | H01H 71/46 | 335/14 |
| 5,245,302 A * | 9/1993 | Brune | H01H 71/405 | 335/23 |
| 5,252,933 A * | 10/1993 | Kamino | H01H 89/08 | 335/172 |
| 5,289,148 A * | 2/1994 | Siglock | H01H 51/12 | 335/14 |
| 5,369,542 A | 11/1994 | Leone et al. | | |
| 5,446,431 A * | 8/1995 | Leach | H01H 71/0214 | 335/18 |
| 5,453,723 A * | 9/1995 | Fello | H01H 9/342 | 335/18 |
| 5,481,235 A * | 1/1996 | Heise | H01H 83/04 | 335/18 |
| 6,242,993 B1 * | 6/2001 | Fleege | H01H 71/125 | 335/18 |
| 6,759,931 B1 * | 7/2004 | Lias | H01H 71/505 | 335/167 |
| 6,867,670 B2 * | 3/2005 | McCormick | H01H 71/46 | 335/13 |
| 6,897,757 B2 * | 5/2005 | Kim | H01H 83/12 | 335/132 |
| 7,391,289 B2 * | 6/2008 | McCoy | H01H 71/16 | 335/16 |
| 7,791,849 B2 | 9/2010 | Davison et al. | | |
| 7,839,617 B2 | 11/2010 | Vicente et al. | | |
| 7,986,203 B2 * | 7/2011 | Watford | H01H 71/0271 | 200/337 |
| 8,081,001 B2 | 12/2011 | Hooper et al. | | |
| 8,093,965 B2 * | 1/2012 | Mittelstadt | H01H 11/0006 | 335/6 |
| 8,159,318 B2 * | 4/2012 | Yang | H01H 71/123 | 335/18 |
| 8,258,898 B2 * | 9/2012 | Fleege | H01H 83/226 | 335/172 |
| 8,559,150 B2 | 10/2013 | Veroni | | |
| 9,859,084 B2 * | 1/2018 | Fasano | H01H 71/32 | |
| 2003/0048169 A1 * | 3/2003 | Katsube | H01H 71/02 | 337/3 |
| 2004/0150495 A1 * | 8/2004 | Lias | H01H 71/505 | 335/2 |
| 2004/0196123 A1 * | 10/2004 | Simms | H01H 89/06 | 335/6 |
| 2005/0195055 A1 * | 9/2005 | McCoy | H01H 71/04 | 335/35 |
| 2007/0046403 A1 * | 3/2007 | Christmann | H01H 71/526 | 335/35 |
| 2007/0046404 A1 * | 3/2007 | Christmann | H01H 71/40 | 335/35 |
| 2008/0094155 A1 * | 4/2008 | Fleege | H01H 71/7418 | 335/6 |
| 2008/0180199 A1 * | 7/2008 | Claeys | H01H 11/00 | 335/202 |
| 2008/0290971 A1 * | 11/2008 | Weber | H01H 71/40 | 335/35 |
| 2010/0156576 A1 * | 6/2010 | Broghammer | H01H 83/20 | 335/35 |
| 2010/0164658 A1 * | 7/2010 | Woo | H01H 71/40 | 335/21 |
| 2010/0238611 A1 * | 9/2010 | DeBoer | H01H 71/02 | 361/634 |
| 2012/0182095 A1 * | 7/2012 | Wendel | H01H 77/108 | 335/18 |
| 2012/0226453 A1 | 9/2012 | Williams et al. | | |
| 2014/0062623 A1 * | 3/2014 | Fasano | H01H 89/08 | 335/16 |
| 2015/0062769 A1 * | 3/2015 | Cortes Rico | H01H 71/40 | 361/93.1 |
| 2016/0012999 A1 * | 1/2016 | Yang | H01H 71/2436 | 335/38 |
| 2016/0049274 A1 * | 2/2016 | Maloney | H01H 71/025 | 335/21 |
| 2016/0163488 A1 * | 6/2016 | Maloney | H01H 9/38 | 335/15 |
| 2017/0098520 A1 * | 4/2017 | Mittelstadt | G01D 5/145 | |

* cited by examiner

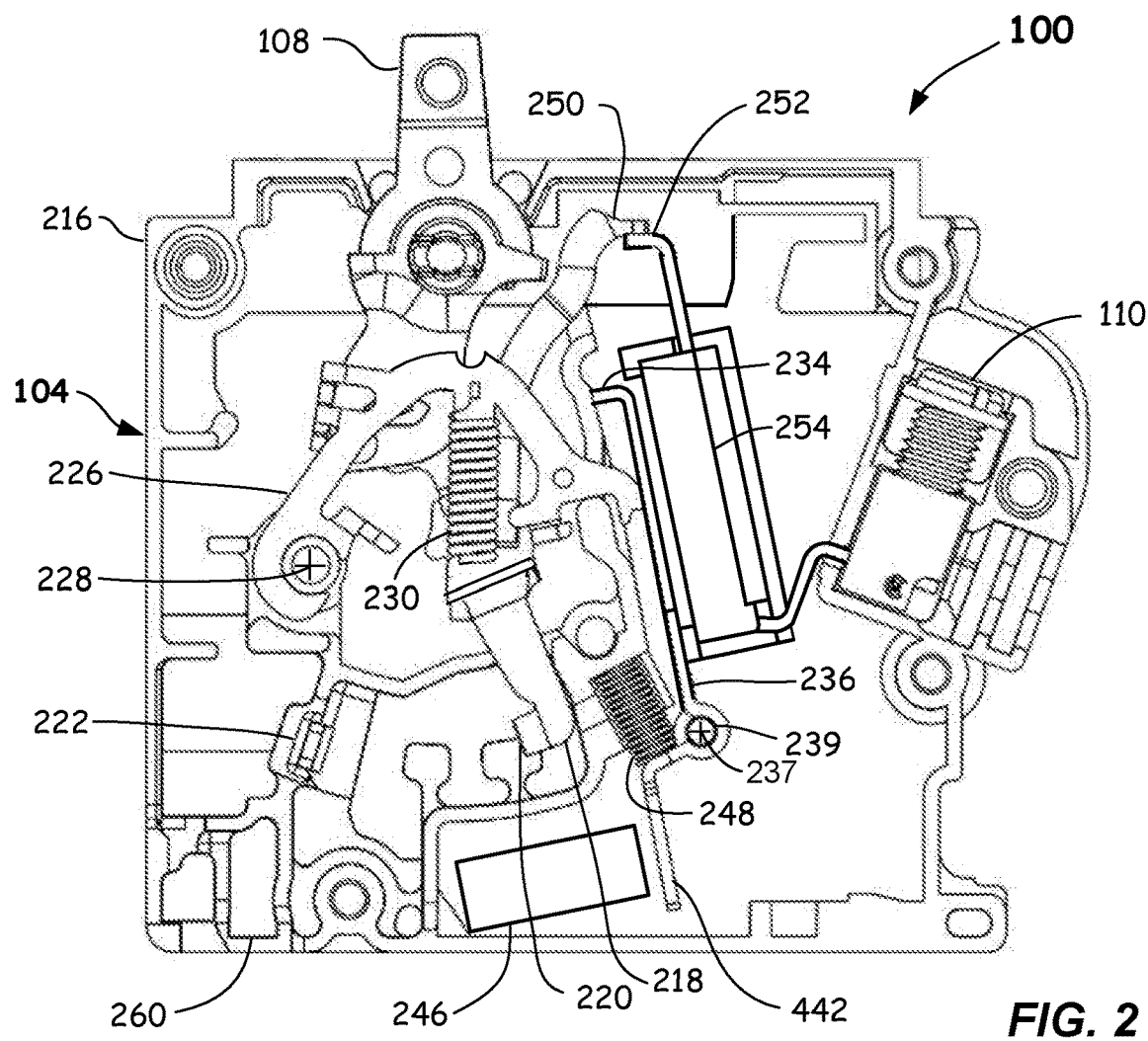
FIG. 2
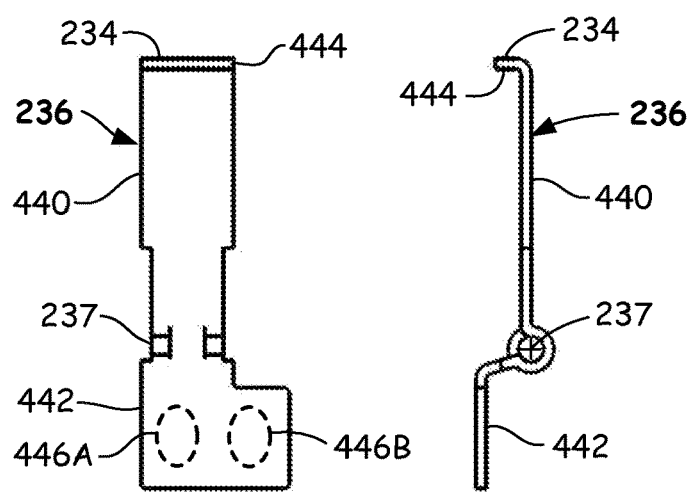
FIG. 4A   FIG. 4B

CIRCUIT BREAKERS INCLUDING DUAL TRIGGERING DEVICES AND METHODS OF OPERATING SAME

FIELD

Embodiments of the disclosure relate to circuit breakers, and more particularly to circuit breakers including electromagnetic triggering devices and operating methods thereof.

BACKGROUND

Electronic circuit breakers are used in certain electrical systems for protecting or controlling electrical circuits coupled to an electrical power source. Examples of electronic circuit breakers include Arc Fault Circuit Breakers (AFC's), Ground Fault Circuit Interrupters (GFCIs), Combination Arc Fault Circuit Interrupters (CAFCI), Transient Voltage Surge Suppressors (TVSSs), and surge protectors. These circuit breakers detect certain types of faults, such as arc faults, ground faults, or other unwanted electrical conditions, and disconnect a power source from a load circuit in response to the fault detection.

SUMMARY

In a first embodiment, a circuit breaker is provided. The circuit breaker includes a first electrical contact and a second electrical contact moveable between an open state and a closed state; an armature, wherein movement of the armature from a first position to a second position initiates the first electrical contact and the second electrical contact to move from the closed state to the open state; a first electromagnetic device configured to move the armature from the first position to the second position in response to being energized by a first signal; and a second electromagnetic device configured to move the armature from the first position to the second position in response to being energized by a second signal and in response to generation of the first signal and the first electrical contact and the second electrical contact being in the closed state.

In another embodiment, a circuit breaker is provided. The circuit breaker includes a first electrical contact and a second electrical contact moveable between an open state and a closed state; a load conductor coupled to the first electrical contact; an armature, wherein movement of the armature from a first position to a second position causes the first electrical contact and the second electrical contact to move from the closed state to the open state; a first electromagnetic device configured to move the armature from the first position to the second position in response to being energized; a second electromagnetic device configured to move the armature from the first position to the second position in response to being energized; and a controller. The controller is configured to monitor at least one of voltage at the load conductor and current flow through the load conductor; generate a first signal to energize the first electromagnetic device in response to monitoring at least one of voltage at the load conductor and current flow through load conductor; monitor the state of the first electrical contact and the second electrical contact; and generate a second signal to energize the second electromagnetic device in response to generating the first signal and the first electrical contact and the second electrical contact being in the closed state.

In another embodiment, a method of operating a circuit breaker is provided. The method includes providing an armature having a first position and a second position, wherein current flow through the circuit breaker is terminated in response to the armature moving from the first position to the second position; generating a signal to energize a first electromagnetic device in response to detection of a fault, wherein energizing the first electromagnetic device moves the armature from the first position to the second position; monitoring current flow through the circuit breaker; and energizing a second electromagnetic device in response to the signal to energize the first electromagnetic device being generated and at least one of a voltage still present on a load terminal of the circuit breaker and a load current still flowing through the circuit breaker, wherein energizing the second electromagnetic device moves the armature from the first position to the second position.

Other features and aspects of the present disclosure will become more fully apparent from the following detailed description, the appended claims, and the accompanying drawings.

BRIEF DESCRIPTION OF THE DRAWINGS

The drawings, described below, are for illustrative purposes only, and are not restrictive. The drawings are not necessarily drawn to scale and are not intended to limit the scope of this disclosure in any way.

FIG. 2 illustrates a side, cutaway view of a mechanical pole of a circuit breaker according to one or more embodiments.

FIG. 4A illustrates an enlarged, front elevation view of an armature used in a circuit breaker according to one or more embodiments.

FIG. 4B illustrates an enlarged, side elevation view of an armature used in a circuit breaker according to one or more embodiments.

DETAILED DESCRIPTION

Figure 1:
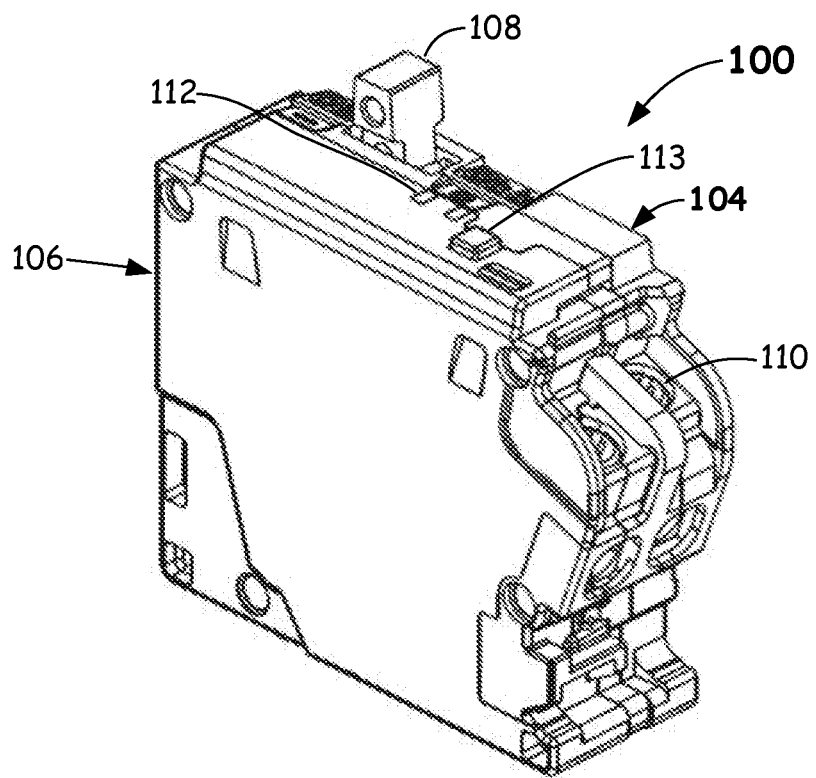
FIG. 1 illustrates a side isometric view of a circuit breaker including a mechanical pole and an electrical pole according to one or more embodiments.

Electronic circuit breakers are devices that are electrically coupled in series with a line and a load and function to prevent overcurrent and other fault conditions from damaging the line, the load, and/or devices coupled between the line and the load. An electronic circuit breaker may include an operating handle mechanically coupled to electrical contacts that electrically couple the line and the load. The electrical contacts open or trip in response overcurrent and other fault conditions to prevent excessive current from being drawn by the load. Under normal operation, the operating handle is positioned in an ON position and the circuit breaker is referred to as being in an ON mode. During the ON mode, the electrical contacts are closed to allow current to flow between the line and the load. When an overcurrent condition or other fault is detected, the circuit breaker trips and enters a TRIP mode, which opens the electrical contacts to prevent or terminate current flow between the line and the load. Tripping may be by activation of a magnetic element or by sensing and activating electromagnetic devices via signals generated by electronics (e.g., a controller) within the circuit breaker. When the circuit breaker is in the TRIP mode, the operating handle is positioned in a TRIP position.

In order to return the electronic circuit breaker from the TRIP mode to the ON mode, a user may manually move the operating handle from the TRIP position, to an OFF position, and back to the ON position. The electrical contacts are open when the operating handle is in the OFF position and they may be forced closed when the operating handle is moved to the ON position. The electrical contacts may remain closed so long as the operating handle is in the ON position.

Many circuit breakers configured for residential use include a bimetal component that functions as a tripping mechanism to trip the circuit breakers from the ON mode to the TRIP mode. The use of a bimetal component requires constant monitoring, testing and/or adjustments of the circuit breakers in production. For example, calibration screws coupled to the bimetal component may have to be mechanically adjusted to set the position of the bimetal component. Afterwards, a thermal test may be performed to ensure that the circuit breakers will trip under certain thermal conditions and within predetermined time limits. If the circuit breakers do not trip within the predetermined time limits, the calibration screw is adjusted again and the thermal test is repeated. Time is required between the thermal tests to allow the bimetal component to cool before the thermal tests can be repeated. This time increases the manufacturing time and costs of the circuit breakers.

Some circuit breakers include electronic trip circuits that activate or energize tripping mechanisms to cause the circuit breakers to enter the TRIP mode. For example, current flow through a circuit breaker may be monitored by trip circuits to determine if current flow is greater than a predetermined value. If current flow greater than the predetermined value is detected, the trip circuits cause the circuit breakers to enter the TRIP mode. Other situations that may cause the circuit breakers to enter the TRIP mode may also be monitored by the trip circuits. Upon a trip event occurring, the trip circuit may generate an electronic signal that causes the circuit breaker to enter the TRIP mode, which opens the contacts within the circuit breaker. When the contacts open, current flow through the circuit breaker terminates. The electronic signal may, as an example, energize an electromagnetic device that moves a tripping device and causes the circuit breaker to enter the TRIP mode.

Anomalies may occur with circuit breakers that include trip circuits to generate electronic signals, which cause the circuit breakers to enter the TRIP mode. For example, these circuit breakers do not include a secondary or backup electronic device to open the contacts and enter the TRIP mode. Therefore, in the event that the trip circuits are unable to generate a signal to open the contacts, the circuit breakers are at risk of thermal overload and other conditions. For example, if the circuit breakers experience a voltage spike or other condition that damages electrical components in the trip circuits, the electronic device cannot open the contacts, which may damage line circuitry, load circuitry, and/or the circuit breakers.

The circuit breakers disclosed herein may include a secondary electronic trip circuit. The primary and secondary trip circuits may be coupled to a primary electromagnetic device and a secondary electromagnet device, both of which may terminate current flow though the circuit breakers in response to being energized. The trip circuits may include components that energize the primary and secondary electromagnetic devices. The secondary trip circuit may energize the secondary electromagnetic device in response to a signal being generated to energize the primary electromagnetic device and current continuing to flow through a circuit breaker. Thus, the secondary electronic trip circuit provides an additional level of protection in the event that the primary electromagnetic device becomes dysfunctional and cannot open the contacts. In addition to the foregoing, the above-described bimetal component may be removed and replaced with electronic thermal overload protection. The removal of the bimetal component reduces the time to produce the circuit breakers.

These and other embodiments of circuit breakers and methods of operating circuit breakers are described below with reference to FIGS. 1-7. Reference will now be made in detail to the example embodiments, which are illustrated in the accompanying drawings. Wherever possible, the same reference numbers will be used throughout the drawings to refer to the same or like parts.

Referring now to FIG. 1, a circuit breaker 100 is illustrated. The circuit breaker 100 may include a first module 104 and a second module 106. The first module 104 may include a mechanical pole and the second module 106 may include an electronic pole. Both the first module 104 and the second module 106 may include housings made of a thermoset resin material or other rigid non-conductive material.

The first module 104 may include a moveable operating handle 108 that indicates and/or sets the mode of the circuit breaker 100. The operating handle 108 may include ON, TRIP, and OFF positions. When the operating handle is in the ON position, the circuit breaker 100 is in an ON mode which causes contacts (not shown in FIG. 1) to close and conduct current to load terminals 110. The operating handle 108 moves to the TRIP position when current flow through the circuit breaker 100, such as through the load terminals 110, exceeds a predetermined amperage or a fault is detected. The operating handle 108 is depicted in FIG. 1 as being in the TRIP position, which may be between the ON position and the OFF position. When the circuit breaker 100 is in the TRIP mode, the contacts are open, which prevents current flow to the load terminals 110. The operating handle 108 may be moved to the OFF position by a user. For example, the operating handle 108 may be moved from the TRIP position to the OFF position in order to move to the ON position. A user may also move the operating handle 108 to the OFF position to manually open the contacts and terminate current flow to the load terminals 110.

The second module 106 may include circuitry (not shown in FIG. 1), such as a controller 556 (FIG. 5A) and/or trip circuitry, that generates a signal to transition the circuit breaker 100 from the ON mode to the TRIP mode. For example, the controller 556 may monitor conditions in the circuit breaker 100 and determine whether these conditions warrant transitioning the circuit breaker 100 to the TRIP mode. If so, the controller 556 may generate a signal to initiate primary components (e.g., a first electromagnetic device) to transition the circuit breaker 100 to the TRIP mode. As described in further detail below, the controller 556 or other circuitry may also determine whether the contacts have opened indicating that the circuit breaker 100 has transitioned to the TRIP mode. If the contacts remain closed after the controller 556 generates the signal, the controller 556 may energize secondary components (e.g. a second electromagnetic device) to cause the circuit breaker 100 to transition to the TRIP mode. The circuit breaker 100 may include an indicator 112 (e.g., a light) that may illuminate to provide an indication that the secondary components had to be energized, which may indicate a fault within the circuit breaker 100. The circuit breaker 100 may also include a test switch 113 that may be pressed to perform a test of the circuit breaker 100. In some embodiments, the controller 556 may detect a change in the state of the test switch 113 and generate the signal to cause the circuit breaker 100 to transition to the TRIP mode.

Reference is now made to FIG. 2, which illustrates a cutaway, side view of an embodiment of the first module 104. The operating handle 108 is shown as being in the TRIP position indicating that the circuit breaker 100 is in the TRIP mode. The TRIP mode occurs when the contacts described herein are in an open state and current does not flow between a line and a load through the circuit breaker 100.

The first module 104 may include a body 216, which may be fabricated (e.g., molded) from a rigid nonconductive material, such as a plastic. The first module 104 may include a moveable arm 218 with a first electrical contact 220 attached thereto. The moveable arm 218 may move the first electrical contact 220 to a position where the first electrical contact 220 electrically contacts a second electrical contact 222, which may be in a fixed position relative to the body 216. When the first electrical contact 220 and the second electrical contact 222 are in electrical contact with each other, the first electrical contact 220 and the second electrical contact 222 are referred to as being in a closed state. In the closed state, the circuit breaker 100 is in the ON mode wherein current conducts between a line connector 260 and the load terminals 110. The moveable arm 218 may move the first electrical contact 220 away from the second electrical contact, which opens the electrical path between the line connector 260 and the load terminals 110. When the first electrical contact 220 and the second electrical contact 222 are not in electrical contact with each other, the first electrical contact 220 and the second electrical contact 222 are referred to as being in an open state. In the open state, the circuit breaker 100 is referred to as being in the TRIP mode or the OFF mode. Movement of the operating handle 108 may cause the moveable arm 218 to move the first electrical contact 220 and the second contact between the open state and the closed state.

The first module 104 may include a cradle 226 that may pivot about a pivot point 228. The pivot point 228 may include a pin (not shown in FIG. 2) that enables the cradle 226 to pivot relative to the body 216. As described in greater detail below, movement of the cradle 226 may cause the moveable arm 218 to separate the first electrical contact 220 from the second electrical contact 222. The cradle 226 may also prevent the operating handle 108 from moving from the TRIP position to the ON position without first moving to the OFF position.

Figure 3:
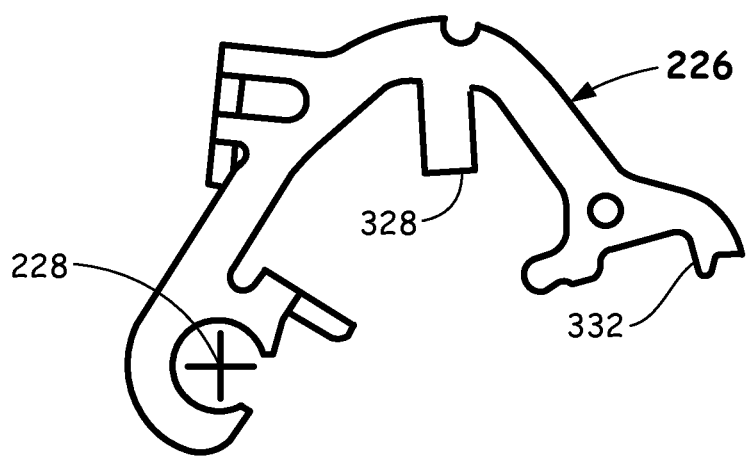
FIG. 3 illustrates an enlarged, side elevation view of a cradle used in a circuit breaker according to one or more embodiments.

Additional reference is made to FIG. 3, which illustrates an enlarged plan view of the cradle 226. The cradle 226 may be substantially C-shaped. A tab 328 may be configured to couple to a biasing mechanism, such as a spring 230 (FIG. 2), that may bias the cradle 226 in a clockwise direction about the pivot point 228. A surface 332 may be located proximate an end of the cradle 226 and may be configured to contact a surface 234 (FIG. 2) of an armature 236. As described below, the surface 234 of the armature 236 may move from a first position to a second position, which releases the cradle 226 to rotate in a clockwise direction about the pivot point 228. This movement of the cradle 226 at least partially results in the circuit breaker 100 transitioning to the TRIP mode. Thus, movement of the armature 236 may initiate tripping of components to transition the circuit breaker 100 into the TRIP mode.

Additional reference is made to FIG. 4A, which illustrates a front elevation view of the armature 236 and FIG. 4B, which illustrates a side elevation view of the armature 236. The armature 236 may include a pivot location 237. A pin 239 (FIG. 2) may extend through the pivot location 237 and may enable the armature 236 to pivot about the pivot location 237 between a first position and a second position. A first portion 440 may extend from first side (e.g., upper side) of the pivot location 237 and a second portion 442 may extend from a second side (e.g., lower side) of the pivot location 237. A lip 444 may extend substantially perpendicular to the first portion 440, wherein the surface 234 is located on the lip 444. The second portion 442 may be wider than the first portion 440 and may include a first area 446A and a second area 446B. An electromagnetic assembly 246 may be located proximate the second portion 442. The electromagnetic assembly 246 may include a first electromagnetic device (not shown in FIGS. 4A and 4B) that may be located proximate the first area 446A and a second electromagnetic device that may be located proximate the second area 446B. Referring again to FIG. 2, an armature spring 248 may bias the armature 236 in a counterclockwise direction about the pivot location 237 to the first position.

The circuit breaker 100 may include an electrical connection between the first electrical contact 220 and the load terminals 110. The electrical connection may include a wire braid 250 coupled between the moveable arm 218 and a load conductor 252. The load conductor 252 may pass through a magnet 254. In some embodiments, the magnet 254 may encircle the load conductor 252. During an overcurrent event, the magnet 254 generates a magnetic field that attracts the first portion 440 (FIG. 4B) so as to rotate the armature 236 in a clockwise direction about the pivot location 237 from the first position to the second position.

Figure 5A:
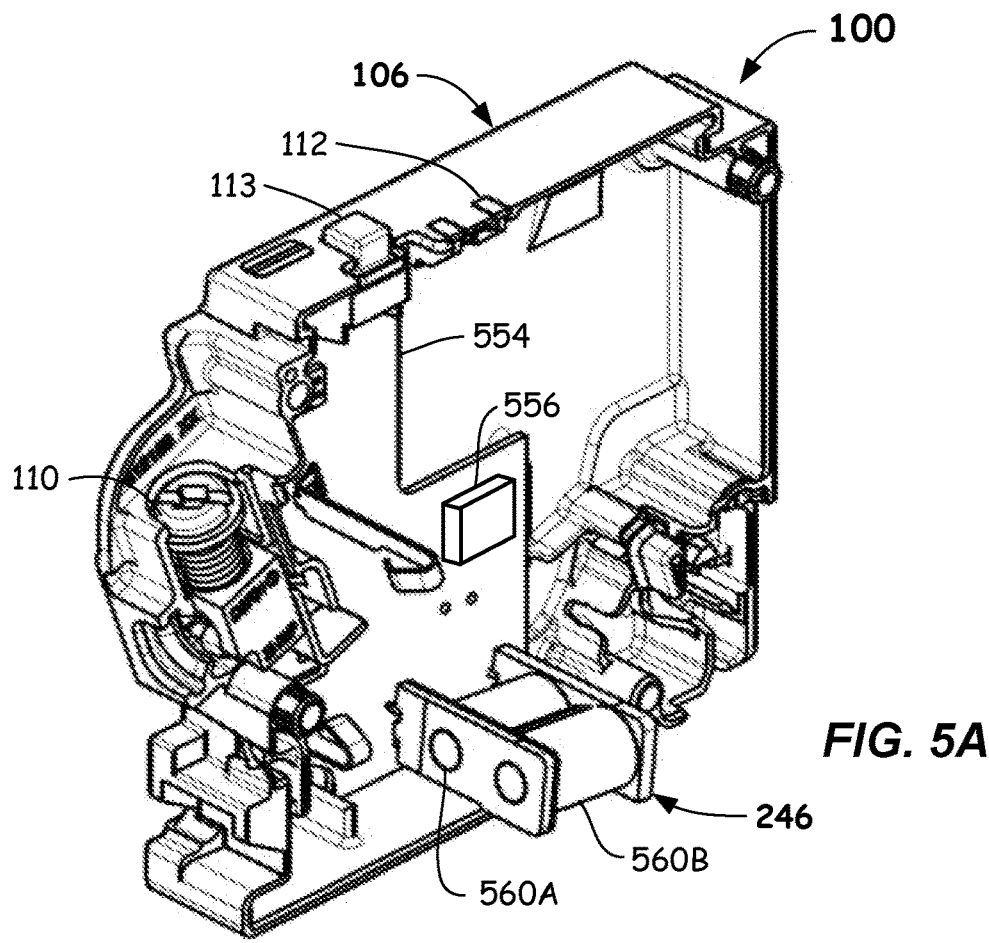
FIG. 5A illustrates a cutaway, isometric view of an electronic pole of a circuit breaker including a printed circuit board and an electromagnetic assembly according to one or more embodiments.
Figure 5B:
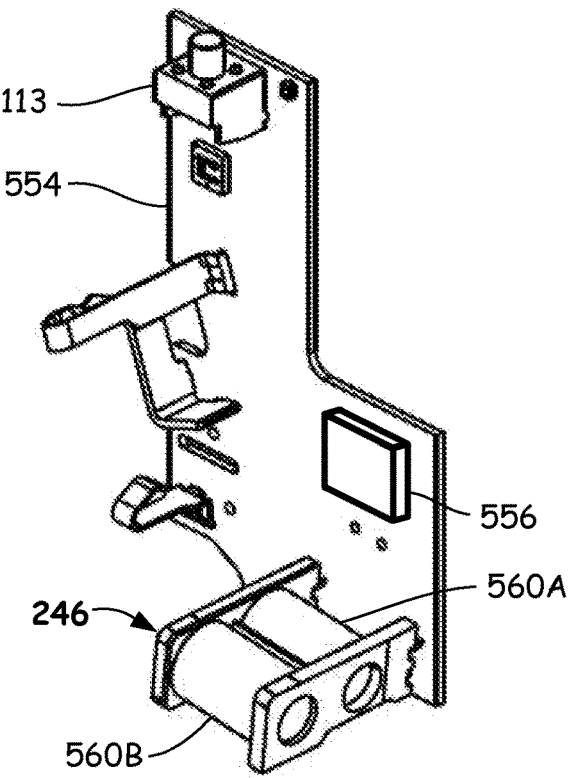
FIG. 5B illustrates an isometric view of a printed circuit board with an electromagnetic assembly coupled thereto according to one or more embodiments.

Reference is now made to FIG. 5A, which illustrates a cutaway, isometric view of an embodiment of the second module 106 of the circuit breaker 100. The second module 106 may include a printed circuit board 554. FIG. 5B illustrates an isometric view of the printed circuit board 554. The electromagnetic assembly 246 and the test switch 113 may be electrically and/or mechanically coupled to the printed circuit board 554. In addition, the controller 556 may be coupled to the printed circuit board 554. Other sensors and monitoring devices may be electrically coupled to the printed circuit board 554 and/or the controller 556. Such devices may be collectively referred to as the trip circuitry and may monitor the current flow through the load terminals 110 and/or the state of the first electrical contact 220 (FIG.

2) and the second electrical contact 222. The controller 556 may generate signals to energize the electromagnetic assembly 246 and illuminate the indicator 112. The state of the first electrical contact 220 and the second electrical contact 222 may be determined by monitoring the current flow through the load terminals 110. If current is flowing, the first electrical contact 220 and the second electrical contact are in the closed state. If current is not flowing, the first electrical contact 220 and the second electrical contact are in the open state.

The electromagnetic assembly 246 may include a first electromagnetic device 560A and a second electromagnetic device 560B that may be individually energized by signals generated by the controller 556 or other circuitry on or coupled to the printed circuit board 554. The electromagnetic devices 560A, 560B include devices having coils located therein, wherein current flow through the coils may constitute energizing the electromagnetic devices 560A, 560B. Current flow through the coils generates magnetic fields. The first electromagnetic device 560A may be located proximate the first area 446A (FIG. 4B) of the armature 236 and the second electromagnetic device 560B may be located proximate the second area 446B of the armature 236.

Figure 6A:
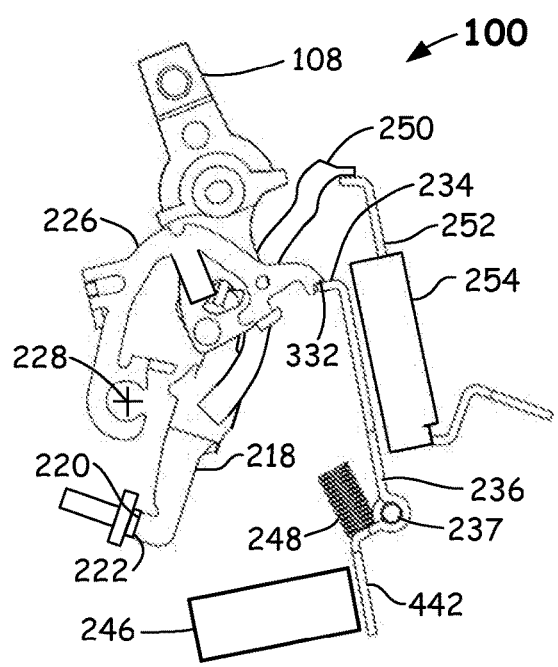
FIG. 6A illustrates a side view of a portion of a mechanical pole of a circuit breaker in an ON mode according to one or more embodiments.
Figure 6B:
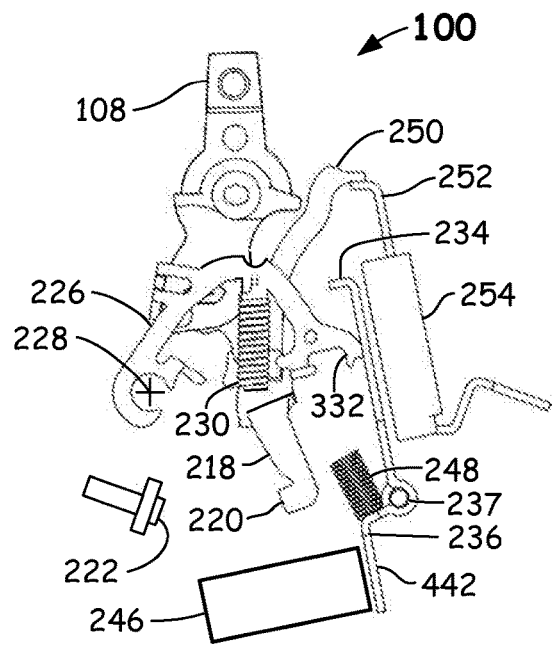
FIG. 6B illustrates a side view of a portion of a mechanical pole of a circuit breaker in a TRIP mode according to one or more embodiments.

During normal use, the circuit breaker 100 is in the ON mode. The positions of certain components in the circuit breaker 100 in the ON mode are illustrated in FIG. 6A. In the ON mode, the first electrical contact 220 contacts the second electrical contact 222, which conduct current between a line connector 260 (FIG. 2) and the load terminals 110. The armature 236 is in the first position, so the surface 332 of the cradle 226 is in contact with the surface 234 of the armature 236. The cradle 226 may be biased in the clockwise direction about the pivot point 228 by the spring 230 (FIG. 6B, not shown in FIG. 6A for illustration purposes). The armature 236 may be biased in the counterclockwise direction about the pivot location 237 by the armature spring 248.

During an overcurrent event, such as a short circuit on circuits coupled to the load terminals 110, a current spike or excessive current flows through the load conductor 252. This high current generates a magnetic field in the magnet 254. The magnetic field generates an attractive force on the first portion 440 of the armature 236, which urges the armature 236 in the clockwise direction toward the second position. When the magnetic field is strong enough or reaches a predetermined value, such greater than the spring force exerted by the armature spring 248, the first portion 440 moves toward the magnet 254. This movement causes the armature 236 to be in the second position, which releases the surface 332 of the cradle 226 from the surface 234 of the armature 236. The cradle 226 is then free to pivot in the clockwise direction about the pivot point 228 to where the cradle 226 is in the position shown in FIG. 6B, which is the TRIP mode of the circuit breaker 100. In the TRIP mode, the first electrical contact 220 and the second electrical contact 222 are in the open state, which prevents current from flowing between the line connector 260 and the load terminals 110.

The circuit breaker 100 may also enter the TRIP mode by signals generated by the controller 556 (FIG. 5) that energize the first electromagnetic device 560A and/or the second electromagnetic device 560B (FIG. 5) in the electromagnetic assembly 246. The controller 556 may generate a first signal to energize the first electromagnetic device 560A in response to determining that a thermal overload, an arc, a ground fault, a self-test (e.g., push-to-test), or other condition has occurred. The thermal overload detection may be accomplished by devices on the printed circuit board 554 monitoring current between the line connector 260 and the load terminals 110. If the current flow is high for a long period, the controller 556 may determine that a thermal overload condition exists. This monitoring of the current may replace bimetal conductors of previous circuit breakers. Arc detection, ground fault detection, and self-test detection may be determined by the controller 556 and/or components on the printed circuit board 554 (FIG. 5) based on monitoring the voltage at the load terminals 110 and/or the current flow between the line connector 260 and the load terminals 110. Other conditions or faults may be detected by the controller 556 and components coupled to the printed circuit board 554.

In response to any of the aforementioned detections, the controller 556 may generate the first signal that energizes the first electromagnetic device 560A. Referring again to FIG. 6A, when the first electromagnetic device 560A is energized, it applies an attractive force on the second portion 442 of the armature 236. When the attractive force overcomes the spring force exerted by the armature spring 248, the armature 236 pivots about the pivot location 237 from the first position to the second position. The pivoting of the armature 236 to the second position releases the surface 234 of the armature 236 from the surface 332 of the cradle 226. The first electrical contact 220 and the second electrical contact 222 transition to the open state and the circuit breaker 100 enters the TRIP mode as described above.

Should the circuitry used to generate the first signal and/or energize the first electromagnetic device 560A fail, the controller 556 may energize the second electromagnetic device 560B. For example, if a voltage surge, current surge, or other anomaly causes the first electromagnetic device 560A or circuitry coupled thereto to fail, the circuit breaker 100 would remain in the ON mode unless the second electromagnetic device 560B is energized. In some embodiments, the controller 556 may monitor the current flow between the line connector 260 and the load terminals 110 to determine if the circuit breaker 100 is in the TRIP or OFF modes. The controller 556 may also measure the voltage of the load terminals 110 which should be zero if the circuit breaker 100 is in the TRIP or OFF modes. In the event that the circuit breaker 100 has not transitioned to the TRIP mode, the controller 556 may energize the second electromagnetic device 560B, which generates an attractive force on the second portion 442 of the armature 236. For example, the controller 556 may generate a second signal that energizes the second electromagnetic device 560B. The attraction force pivots the armature 236 about the pivot location 237 as described above and causes the circuit breaker 100 to transition to the TRIP mode.

In some embodiments, the controller 556 may be configured to monitor at least one of a voltage and current flow through the load conductor 252 (FIG. 2). The voltage at the load conductor 252 is the same voltage at the load terminals 110 (FIG. 2) and the current flow through the load conductor 252 is the same as the current flow between the line connector 260 and the load terminals 110. The controller 556 may be further configured to energize the first electromagnetic device 560A, such as by generating a first signal that energizes the first electromagnetic device 560A in response to monitoring at least one of the voltage and current flow through the load conductor 252. The controller 556 may be further configured to monitor the state of the first electrical contact 220 and the second electrical contact 222. For example, if the controller 556 generated the first signal to energize the first electromagnetic device, the state of the first electrical contact 220 and the second electrical contact 222 should be open. The controller 556 may be further configured to energize the second electromagnetic device 560B in response to the controller generating the first signal to energize the first electromagnetic device 560A and the first electrical contact 220 and the second electrical contact 222 being in the closed state. For example, the controller 556 may generate a second signal to energize the second electromagnetic device 560B.

When the controller 556 or other circuitry detects that energizing the first electromagnetic device 560A or generating the first signal does not cause the circuit breaker 100 to enter the TRIP mode, the controller 556 may generate a signal to illuminate the indicator 112 (FIG. 1). In some embodiments, if the second electromagnetic device 560B is energized, the controller 556 may illuminate the indicator 112. The illuminated indicator 112 provides a user with a visual indication that the first electromagnetic device 560A or circuits associated therewith are not functioning.

Figure 6C:
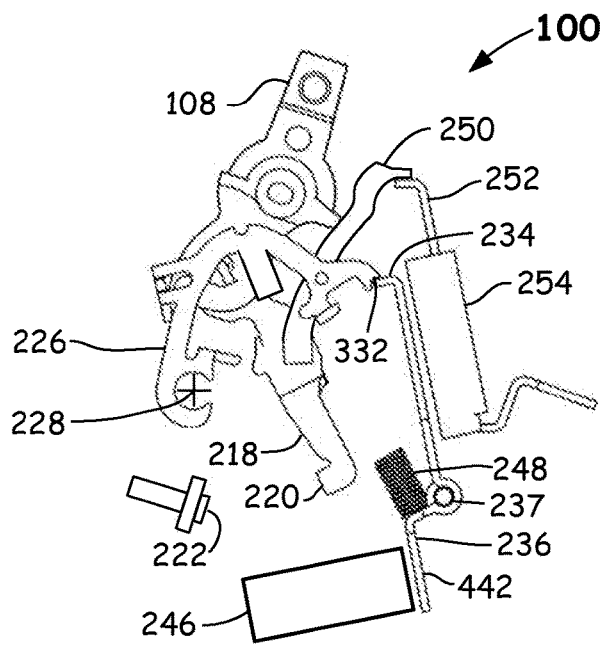
FIG. 6C illustrates a side view of a portion of a mechanical pole of a circuit breaker in an OFF mode according to one or more embodiments.

Additional reference is made to FIG. 6C, which illustrates certain components of the circuit breaker 100 in the OFF mode. When the operating handle 108 is in the TRIP position, a user may rotate the operating handle 108 clockwise to the OFF position as shown in FIG. 6C. The OFF mode of the circuit breaker 100 resets the surface 332 of the cradle 226 with the surface 234 of the armature 236, but the first electrical contact 220 does not contact the second electrical contact 222. The user may then rotate the operating handle 108 counterclockwise to the ON position where the first electrical contact 220 electrically contacts the second electrical contact 222 as shown in FIG. 6C.

Figure 7:
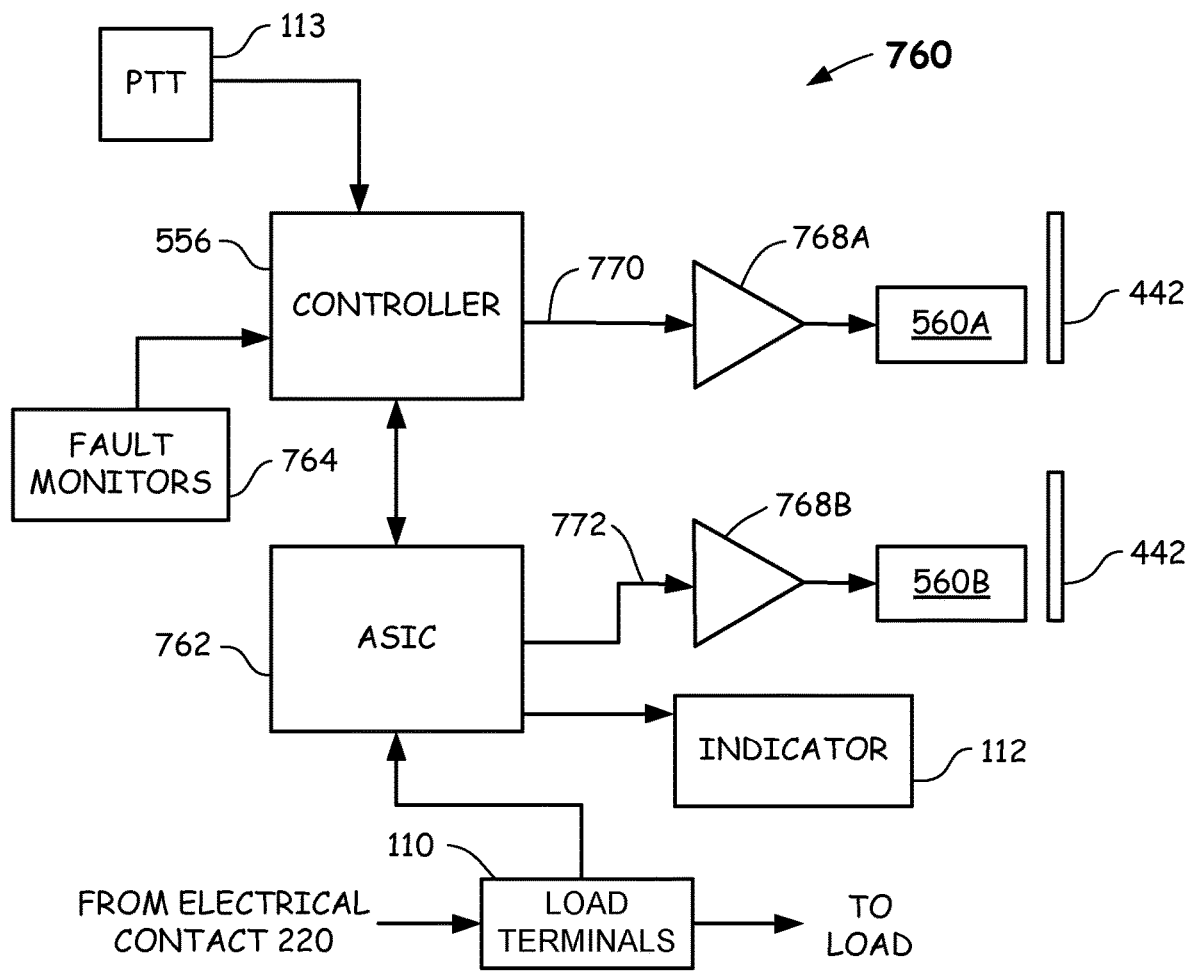
FIG. 7 illustrates a block diagram of an embodiment of some of the electrical and mechanical components within a circuit breaker according to one or more embodiments.

Reference is now made to FIG. 7, which illustrates a block diagram of an embodiment of some of the electrical and mechanical components within the circuit breaker 100 (FIG. 1). Specifically, FIG. 7 illustrates circuitry 760 and the above-described components coupled together. The circuitry 760 may include the controller 556 in communication with an application-specific integrated circuit (ASIC) 762 or other similar device or circuitry. In some embodiments, the ASIC 762 may be integrated into the controller 556 or visa-versa to form a single device. The controller 556 may be coupled to one or more fault monitors 764 that monitor conditions within the circuit breaker 100 as described above. Based on inputs from the fault monitors 764, the controller 556 may generate the first signal as described herein. The controller 556 may also receive an input from the test switch 113, such as a push-to-test signal.

When the controller 556 receives a signal from the fault monitors 764 indicating a fault condition or a signal from the test switch 113, the controller 556 may generate the first signal. The first signal may be transmitted to a first driver 768A by a line 770 and may be used to attempt to energize the first electromagnetic device 560A. The first driver 768A may generate a signal strong enough to energize the first electromagnetic device 560A in response to receiving the first signal. The first electromagnetic device 560A may then generate a magnetic field that attracts the second portion 442 of the armature 236 to initiate tripping of the circuit breaker to the TRIP mode as described above. The controller 556 may also transmit a signal to the ASIC 762 indicating that the first signal has been generated. In some embodiments, the ASIC 762 may monitor the line 770 to determine whether the first signal has been generated.

The ASIC 762 may monitor the load terminals 110 to determine whether the first electrical contact 220 and the second electrical contact 222 have transitioned to the open state. For example, the ASIC 762 may measure the current flow at the load terminals 110 or other current conducting component coupled thereto. If the ASIC 762 determines that current is continuing to flow through the load terminals 110, then the first electrical contact 220 and the second electrical contact 222 did not transition to the open state. If, in addition to detecting the above-described current flow, the ASIC 762 has received a signal that the first signal was generated, the ASIC 762 can generate the second signal to energize the second electromagnetic device 560B. The second signal may be transmitted via a line 770 to a second driver 768B that may generate a signal strong enough to energize the second electromagnetic device 560B, which attracts the second portion 442 of the armature 236 and initiates tripping of the circuit breaker. In some embodiments, the first driver 768A and/or the second driver 768B are silicon-controlled rectifiers. The ASIC 762 may also illuminate the indicator 112 upon generation of the second signal.

The circuit breaker 100 described herein provides a backup system in the event that the first electromagnetic device 560A or circuits coupled thereto fail. Accordingly, the circuit breaker 100 provides safer operation relative to other circuit breakers. The circuit breaker 100 may not include a bimetal strip, be devoid of the bimetal strip, so the calibration processes associated with a bimetal strip are not required.

Figure 8:
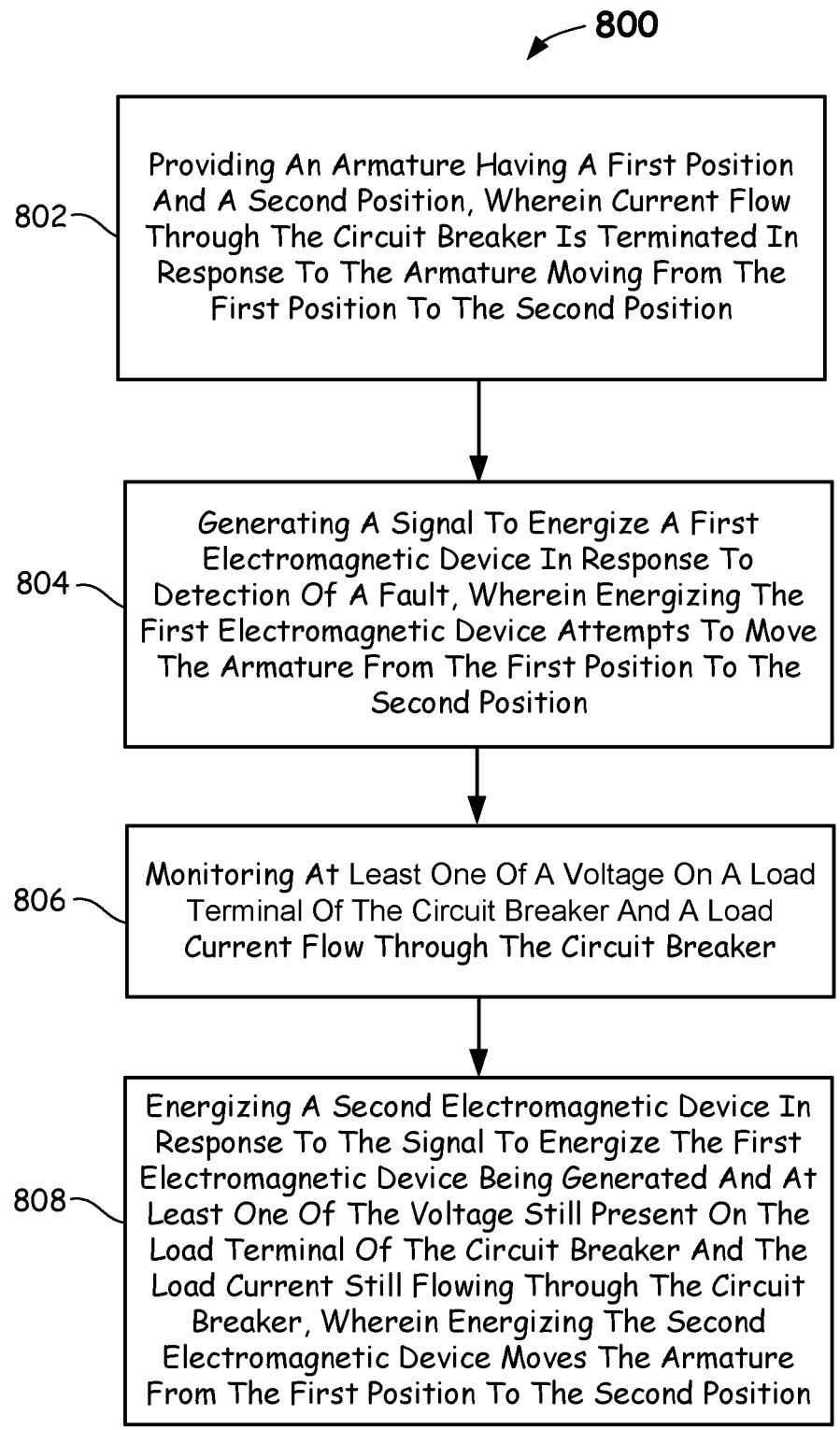
FIG. 8 illustrates a flowchart describing a method of operating a circuit breaker according to one or more embodiments.

In another aspect, a method of operating a circuit breaker (e.g., circuit breaker 100) is provided and is illustrated by the flowchart 800 of FIG. 8. The method may include, in 802, providing an armature (e.g., armature 236) having a first position and a second position, wherein current flow through the circuit breaker is intended to be terminated in response to the armature moving from the first position to the second position. The method may include, in 804, generating a signal to energize a first electromagnetic device (e.g., first electromagnetic device 560A) in response to detection of a fault, wherein energizing the first electromagnetic device moves the armature from the first position to the second position. The method may include, in 806, monitoring current flow through the circuit breaker. The method may include, in 808, energizing a second electromagnetic device (e.g., second electromagnetic device 560B) in response to the signal to energize the first electromagnetic device being generated and at least one of a voltage still present on a load terminal (e.g., load terminals 110) of the circuit breaker and a load current still flowing through the circuit breaker, wherein energizing the second electromagnetic device moves the armature from the first position to the second position.

The foregoing description discloses only example embodiments of the disclosure. Modifications of the above disclosed apparatus and methods which fall within the scope of the disclosure will be readily apparent to those of ordinary skill in the art. Accordingly, while the present disclosure has been described in connection with example embodiments thereof, it should be understood that other embodiments may fall within the scope of the disclosure, as defined by the claims.

What is claimed is:

1. A circuit breaker, comprising:
   a first electrical contact and a second electrical contact moveable between an open state and a closed state;
   an armature, wherein movement of the armature from a first position to a second position initiates the first electrical contact and the second electrical contact to move from the closed state to the open state;
   a first electromagnetic device configured to move the armature from the first position to the second position in response to being energized by a first signal;

a second electromagnetic device configured to move the armature from the first position to the second position in response to being energized by a second signal, the second signal generated in response to the first signal being generated and the first electrical contact and the second electrical contact still being in the closed state; and a controller electrically coupled to the first electromagnetic device and the second electromagnetic device, the controller configured to:
- monitor at least one condition on at least one of a voltage at a load terminal and current flow through the load terminal,
- generate the first signal in response to monitoring at least one of a voltage at the load terminal and current flow through the load terminal,
- monitor the state of the first electrical contact and the second electrical contact, and
- generate the second signal in response to the first signal being generated and the first electrical contact and the second electrical contact still being in the closed state.

2. The circuit breaker of claim 1, further comprising an indicator configured to illuminate in response to the generating the second signal.

3. The circuit breaker of claim 1, wherein the first electromagnetic device is configured to be energized in response to detection of a ground fault.

4. The circuit breaker of claim 1, wherein the first electromagnetic device is configured to be energized in response to detection of an arc.

5. The circuit breaker of claim 1, wherein the first electromagnetic device is configured to be energized in response to detection of a thermal overload.

6. The circuit breaker of claim 1, further comprising a test switch and wherein the first electromagnetic device is configured to be energized in response to changing a state of the test switch.

7. A method of operating a circuit breaker, comprising:
providing an armature having a first position and a second position, wherein current flow through the circuit breaker is terminated in response to the armature moving from the first position to the second position;
generating a signal to energize a first electromagnetic device in response to detection of a fault, wherein energizing the first electromagnetic device attempts to move the armature from the first position to the second position;
monitoring at least one of a voltage on a load terminal of the circuit breaker and a load current flow through the circuit breaker; and
energizing a second electromagnetic device in response to the signal to energize the first electromagnetic device being generated and at least one of a voltage still present on a load terminal of the circuit breaker and a load current still flowing through the circuit breaker, wherein energizing the second electromagnetic device moves the armature from the first position to the second position.

8. The method of claim 7, wherein a fault includes an arc, a ground fault, and a thermal overload.

9. The method of claim 7, further comprising illuminating an indicator in response to energizing the second electromagnetic device.

10. The method of claim 7, wherein the first electromagnetic device is configured to be energized in response to changing a state of a test switch.

11. The method of claim 7, wherein the first electromagnetic device is configured to be energized in response to detection of a thermal overload.

12. The method of claim 7, wherein the first electromagnetic device is configured to be energized in response to detection of a ground fault.

* * * * *